US00RE38605E1

(19) United States
(12) Reissued Patent
Kubica et al.

(10) Patent Number: US RE38,605 E
(45) Date of Reissued Patent: Sep. 28, 2004

(54) GOLF CLUB WITH DIFFERENT SHAFT ORIENTATIONS AND METHOD OF MAKING SAME

(75) Inventors: Daniel J. Kubica, Phoenix, AZ (US); John A. Solheim, Phoenix, AZ (US)

(73) Assignee: Karsten Manufacturing Corporation, Phoenix, AZ (US)

(21) Appl. No.: 09/866,146

(22) Filed: May 25, 2001

Related U.S. Patent Documents

Reissue of:
(64) Patent No.: 5,906,549
Issued: May 25, 1999
Appl. No.: 08/988,910
Filed: Dec. 11, 1997

(51) Int. Cl.[7] ..... A63B 53/02
(52) U.S. Cl. ..... 473/314; 473/248
(58) Field of Search ..... 473/246, 248, 473/287, 288, 305–312, 314, 315, 345, 346, 349, 350

(56) References Cited

U.S. PATENT DOCUMENTS

| | | | |
|---|---|---|---|
| 1,133,129 | A | 3/1915 | Govan |
| 1,167,106 | A | 1/1916 | Palmer |
| 1,538,312 | A | 5/1925 | Beat |

(List continued on next page.)

FOREIGN PATENT DOCUMENTS

| | | |
|---|---|---|
| CN | 139608 | 8/1990 |
| GB | 751323 | 8/1954 |
| GB | 1271854 | 4/1972 |
| GB | 2197209 | 5/1988 |
| GB | 2207358 | 2/1989 |
| GB | 2241173 | 8/1991 |
| WO | PCT/GB87/00789 | 5/1988 |

OTHER PUBLICATIONS

*Zevo Golf Co., Inc.* v. *Karsten Mfg. Corp., et al.*, "Corrected Brief of Plaintiff—Appellant Zevo Golf".

*Zevo Golf Co., Inc.* v. *Karsten Mfg. Corp., et al.*, "Reply Brief of Plaintiff—Appellant Zevo Golf Company, Inc.".

*Zevo Golf Co., Inc.* v. *Karsten Mfg. Corp., et al.*, "Brief for Defendants—Cross Appellants".

*Zevo Golf Co., Inc.* v. *Karsten Mfg. Corp., et al.*, "Repy Brief for Defendants—Cross Appellants"—Non–Confidential Version.

Affidavit of Peter Joseph Shanks dated Jun. 19, 2002. UK.

Petron Gold Equipment 15$^{th}$ Anniversary Pro Only Price list, Dec. 1, 1988. UK.

Affadavit of Daniel James Kubica dated May 15, 2001. U.S.A.

Order Granting Plaintiff's Motion for Partial Summary Judgement filed Jul 12, 2001, *Zevo Golf Co., Inc.* v. *Karsten Manufacturing Corp.*, Case No. 99–CV–2310H in the United States District Court of the Southern District of California.

*Primary Examiner*—Steven Wong
(74) *Attorney, Agent, or Firm*—Robert D. Atkins; Quarles & Brady Streich Lang LLP

(57) ABSTRACT

A golf club is comprised of a head including a hollow body having a top wall, a bottom wall, and a front wall arranged for impacting a golf ball. A bore is disposed in the head adjacent a heel end thereof behind the body front wall extending downwardly from the body top wall toward the body bottom wall. A hosel having a generally lengthwise passage is inserted into the bore. The hosel passage is oriented at a predetermined angle relative to a longitudinal axis of the bore, and a tip end of a shaft is received in the hosel passage so that the shaft is disposed at a desired orientation with respect to the head. The hosel is selected from a plurality of hosels with passages disposed at different predetermined angles relative to the bore longitudinal axis. This allows adjustment of the desired orientation of the shaft so that the golf club may be custom fit to a particular golfer.

15 Claims, 8 Drawing Sheets

U.S. PATENT DOCUMENTS

| | | | | | |
|---|---|---|---|---|---|
| 1,562,956 | A | | 11/1925 | Guerne | |
| 1,840,924 | A | | 1/1932 | Tucker | |
| 2,067,556 | A | * | 1/1937 | Wettlaufer | 473/305 |
| 2,219,670 | A | | 10/1940 | Wettlaufer | |
| 2,460,435 | A | | 2/1949 | Schaffer | |
| 2,809,838 | A | | 10/1957 | Oquist | |
| 3,064,980 | A | | 11/1962 | Steiner | |
| 3,572,709 | A | | 3/1971 | Risher | |
| 3,810,621 | A | | 5/1974 | Mills | |
| 3,829,092 | A | * | 8/1974 | Arkin | 473/306 |
| 4,417,731 | A | | 11/1983 | Yamada | |
| 4,511,145 | A | | 4/1985 | Schmidt | |
| 4,854,583 | A | | 8/1989 | Kobayashi | |
| 4,869,507 | A | | 9/1989 | Sahm | |
| 4,943,059 | A | | 7/1990 | Morell | |
| 4,948,132 | A | * | 8/1990 | Wharton | 473/246 |
| 4,957,294 | A | | 9/1990 | Long | |
| 4,984,794 | A | | 1/1991 | Pernelle et al. | |
| 5,028,049 | A | | 7/1991 | McKeighen | |
| 5,042,806 | A | | 8/1991 | Helmstetter | |
| 5,058,895 | A | | 10/1991 | Igarashi | |
| 5,067,715 | A | | 11/1991 | Schmidt et al. | |
| 5,141,230 | A | | 8/1992 | Antonious | |
| 5,163,682 | A | | 11/1992 | Schmidt et al. | |
| 5,184,819 | A | | 2/1993 | Desbiolles | |
| 5,197,733 | A | * | 3/1993 | Schroder | 473/314 |
| 5,207,428 | A | | 5/1993 | Aizawa | |
| 5,219,408 | A | | 6/1993 | Sun | |
| 5,232,224 | A | * | 8/1993 | Zeider | 473/345 |
| 5,244,211 | A | | 9/1993 | Lukasiewicz | |
| 5,255,914 | A | | 10/1993 | Schroder | |
| 5,261,663 | A | | 11/1993 | Anderson | |
| 5,310,186 | A | | 5/1994 | Karsten | |
| 5,335,909 | A | * | 8/1994 | Green, Jr. | 473/305 |
| 5,380,010 | A | | 1/1995 | Werner et al. | |
| 5,429,357 | A | | 7/1995 | Kobayashi | |
| 5,452,890 | A | | 9/1995 | Bingman | |
| 5,513,844 | A | * | 5/1996 | Ashcraft et al. | 473/288 |
| 5,538,246 | A | * | 7/1996 | Dekura | 473/305 |
| 5,542,666 | A | | 8/1996 | Chou | |
| 5,547,427 | A | | 8/1996 | Rigal et al. | |
| 5,575,723 | A | | 11/1996 | Take et al. | |
| 5,586,948 | A | | 12/1996 | Mick | |
| 5,626,528 | A | | 5/1997 | Toulon | |
| 5,720,674 | A | | 2/1998 | Galy | |
| 5,766,094 | A | | 6/1998 | Mahaffey et al. | |
| 5,776,011 | A | | 7/1998 | Su et al. | |
| RE35,931 | E | | 10/1998 | Schroder et al. | |
| 5,839,973 | A | | 11/1998 | Jackson | |
| 5,851,155 | A | | 12/1998 | Wood et al. | |
| 5,954,596 | A | | 9/1999 | Noble et al. | |

* cited by examiner

GOLF CLUB WITH DIFFERENT SHAFT ORIENTATIONS AND METHOD OF MAKING SAME

Matter enclosed in heavy brackets [ ] appears in the original patent but forms no part of this reissue specification; matter printed in italics indicates the additions made by reissue.

BACKGROUND OF THE INVENTION

This invention relates generally to golf clubs and, in particular, to a golf club commonly referred to as a "metal wood".

U.S. Pat. No. 5,232,224 to R. Zeider discloses a metal wood having a shaft attached to a head by a hosel tube. The shaft may be positioned in different orientations with respect to the head by repositioning the hosel tube relative to the head. This repositioning of the hosel tube is accomplished by providing an opening in the head through which the hosel tube passes that is larger than the hosel tube. The hosel tube is titled into a desired position and then welded to the head. Thus, shaft orientation may be adjusted.

SUMMARY OF THE INVENTION

The present invention provides a golf club comprised of a head including a hollow body having a top wall, a bottom wall, and a front wall arranged form impacting a golf ball. The head further includes a heel end and a toe end, the head also has a bore disposed in the heel end behind the body front wall extending downwardly from the body top wall toward the body bottom wall. The bore has a longitudinal axis. A hosel is inserted into the bore. The hosel has a passage extending generally lengthwise thereof. The passage is oriented at a predetermined angle relative to the longitudinal axis of the bore. A shaft has a tip end received in the hosel passage. The shaft is disposed at a desired orientation with respect to the head. The hosel is selected from a plurality of hosels with passages disposed at different predetermined angles relative to the longitudinal axis of the bore so that the desired orientation of the shaft with respect to the head may be adjusted.

BRIEF DESCRIPTION OF THE DRAWINGS

FIG. 1b is a front elevational view of the head shown in FIG. 1a;

DESCRIPTION OF THE PREFERRED EMBODIMENT

Figure 1:
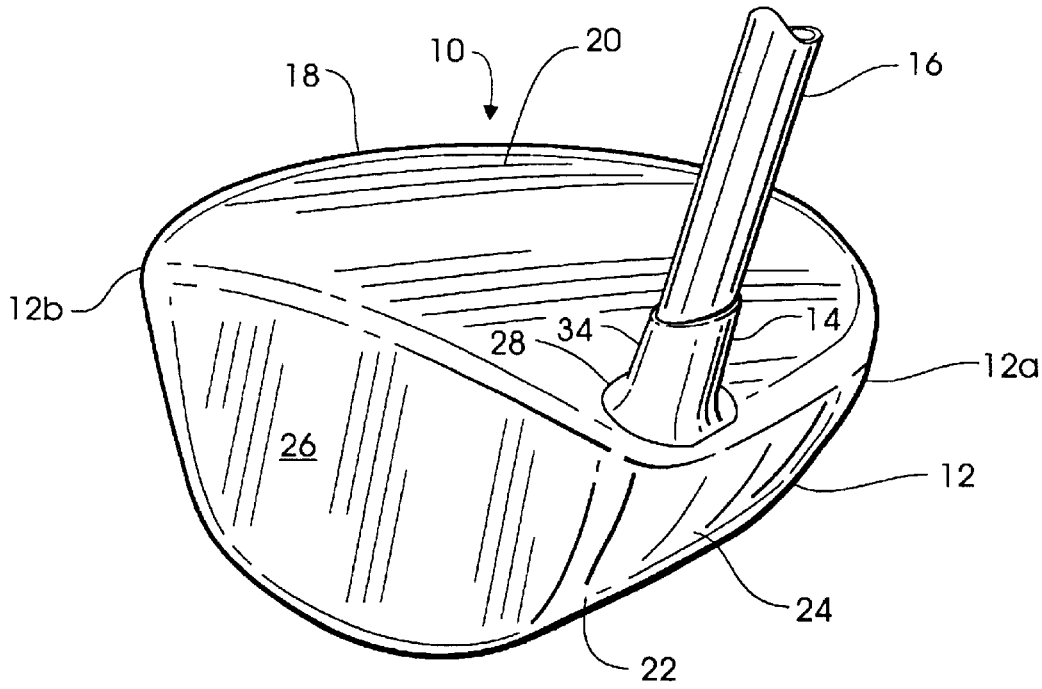
FIG. 1 is a perspective view of a golf club, partially broken away, according to the present invention.
Figure 1A:
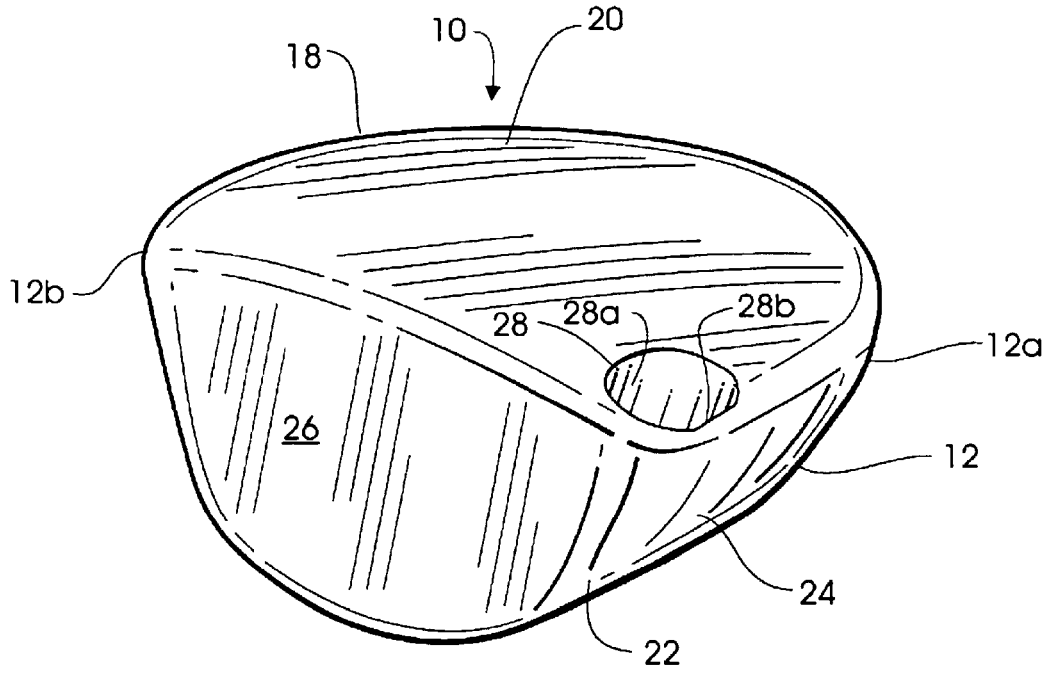
FIG. 1a is a perspective view of the head of the golf club shown in FIG. 1.
Figure 1B:
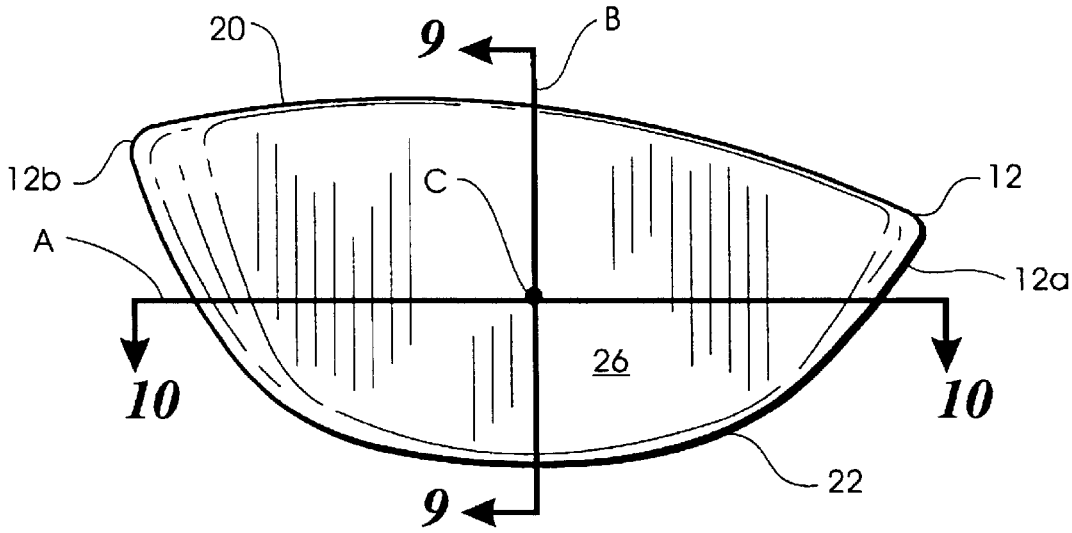

Referring to FIG. 1, a golf club 10 incorporating the present invention includes a head 12, a hosel 14 and a shaft 16. Head 12 is comprised of a hollow body 18 made of a first material such as titanium having a high shear modulus of elasticity. The hollow body 18 has a top wall 20, a bottom wall 22, a side wall 24 connecting the top and side walls 20 and 22, and a front wall 26 arranged for impacting a golf ball. Further, the head 12 has a heel end 12a and a toe end 12b.

Figure 3:
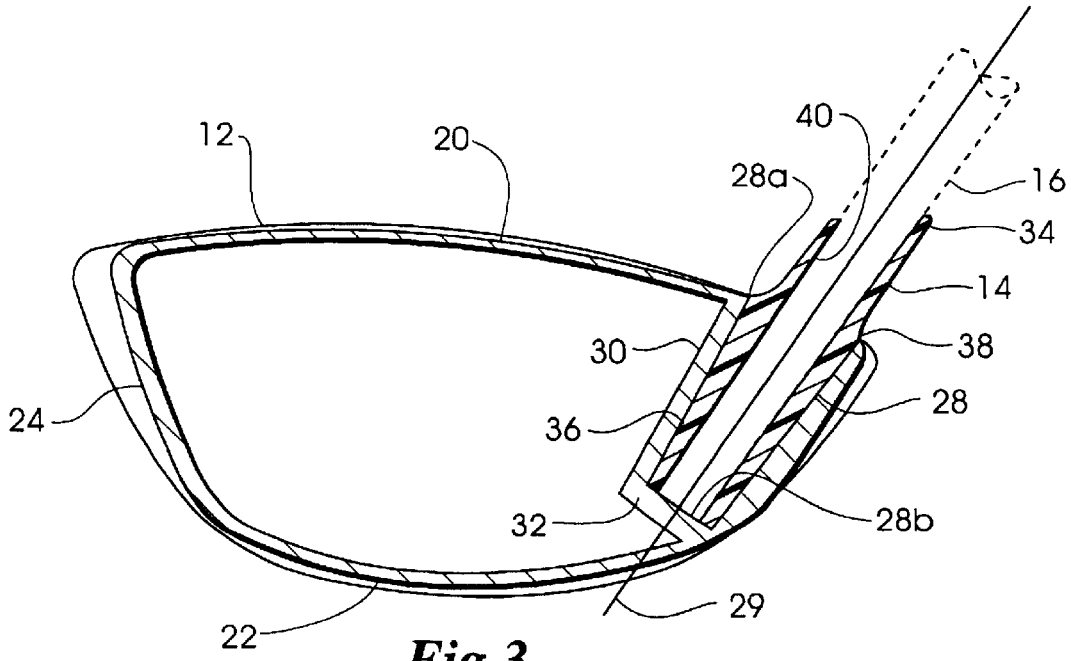
FIG. 3 is a sectional view taken along lines 3—3 in FIG. 2.
Figure 4:
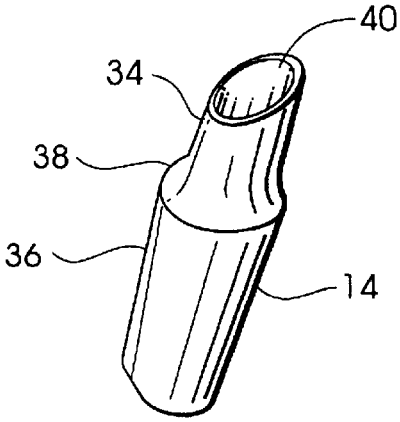
FIG. 4 is a perspective view of the hosel used in the golf club shown in FIGS. 1–3.
Figure 5:
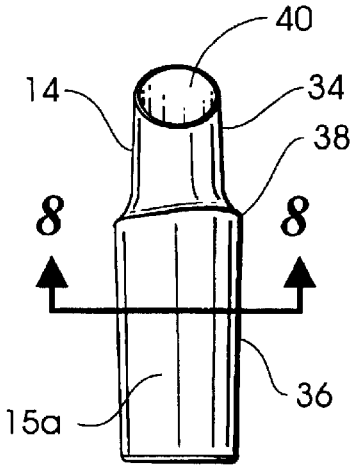
FIG. 5 is a front elevational view of the hosel shown in FIG. 4.
Figure 6:
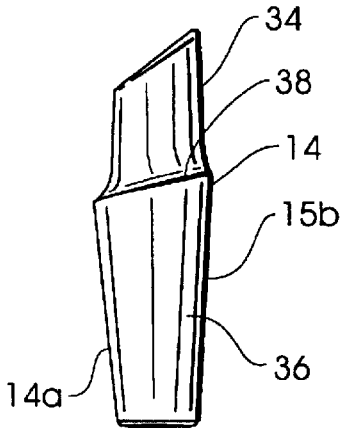
FIG. 6 is a side elevation view of the hosel shown in FIG. 4.
Figure 7:
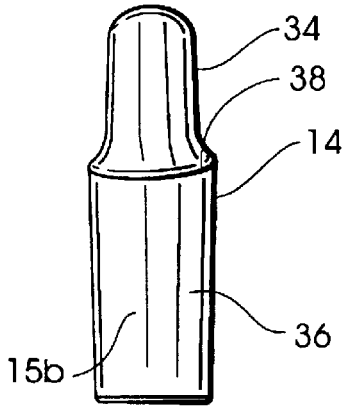
FIG. 7 is a rear elevational view of the hosel shown in FIG. 4.

A bore 28 is provided in the heel end 12a of the head 12 extending downwardly from the body top wall 20 toward the body bottom wall 22. The bore 28 has a top end 28a which is open and a bottom 28b which is closed. As seen in FIG. 3, the top end 28a of the bore 28 is substantially flush with the top wall 20 of the body 18, and the bore bottom end 28b is spaced from the bottom wall 22 of the body 18. The bore 28 has a longitudinal axis 29 and is defined by a lateral wall 30 connected with the side wall 24 of the body 18, and an end wall 32 connected with the lateral wall 30.

The hosel 14 is formed of a second material such as plastic having a low shear modulus of elasticity. Hosel 14 includes an upper portion 34 that extends upwardly from the top wall 20 of the body 18 and a lower portion 36 that is inserted into the bore 28. The upper and lower hosel portions 34, 36 are separated by a parting line 38. The hosel 14 also has a passage 40 extending generally lengthwise through its upper and lower portions 34, 36. When the golf club 10 is assembled as shown in FIG. 3, the hosel 14 contacts the bottom end 32 of the bore 28.

The shaft 16 is made of a third material, preferably graphite, having a low shear modulus of elasticity. Shaft 16 has a tip end 17 received in the hosel passage 40. The shaft tip end 17 extends completely through the hosel 14 and contacts the bottom end 32 of the hole 28. In the preferred embodiment of the golf club 10, the shaft modulus of elasticity of the hosel 14 is much closer to the shear elastic modulus of the shaft 16 than to the shear elastic modulus of the head 120. This relationship of elastic moduli causes the hosel 14 to absorb much of the shock resulting from the head 12 striking a golf ball on the front face 26. Therefore, less shock is transmitted to the shaft 16 which prevents breakage of the shaft 16 and permits the shaft 16 to have a weaker tip end 17 which reduces costs.

Referring to FIGS. 4–8, it is seen that the lower portion 36 of the hosel 14 has an irregular outside shape defined by a generally arcuate surface 15a covering its front and sides, and a generally flat surface 15b covering its back. The bore 28 in the head 12 has a complementary irregular inside shape defined by a generally arcuate surface 28c and a generally flat surface 28b. Therefore, the hosel 14 may be inserted into the bore 28 is only one orientation which ensures exact alignment of the shaft 16 relative to the head 12. In that orientation, the generally arcuate surfaces 15a; 28a of the hosel 14 and the bore 28 mate with each other, and the generally flat surfaces 15b, 28b of the hosel 14 and the bore 28 also mate with each other.

Since the hosel 14 is made of softer material than the head 12, the hosel 14 has a cushioning effect on the shaft 16. This cushioning effect significantly reduces the amount of vibration that is transmitted to the shaft 16 which increases shaft life.

Figure 8:
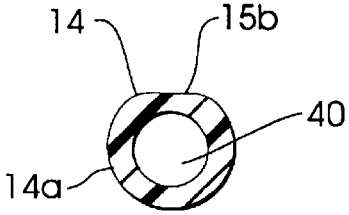
FIG. 8 is a sectional view taken along lines 8—8 in FIG. 5.
Figure 9:
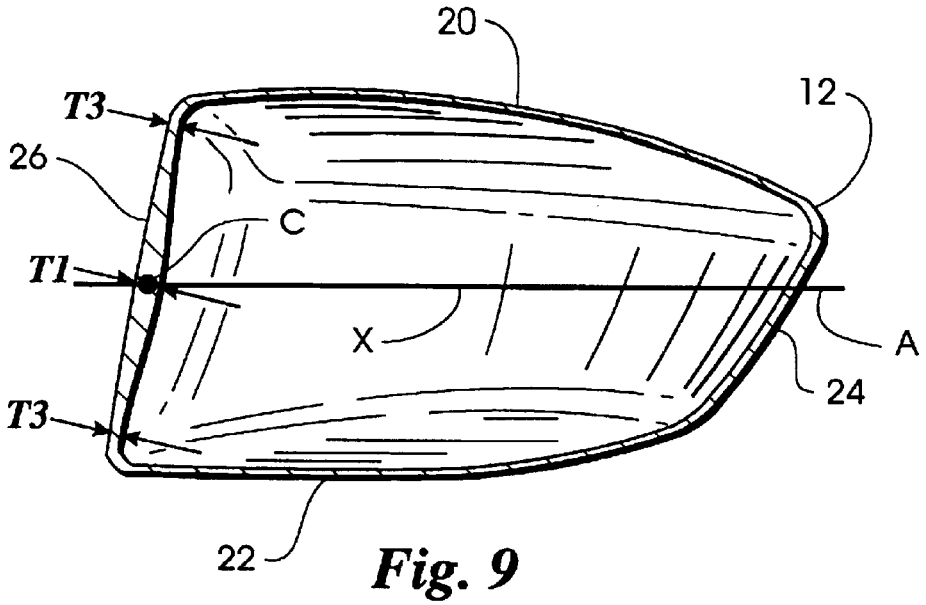
FIG. 9 is a sectional view taken along lines 9—9 in FIG. 1b.
Figure 10:
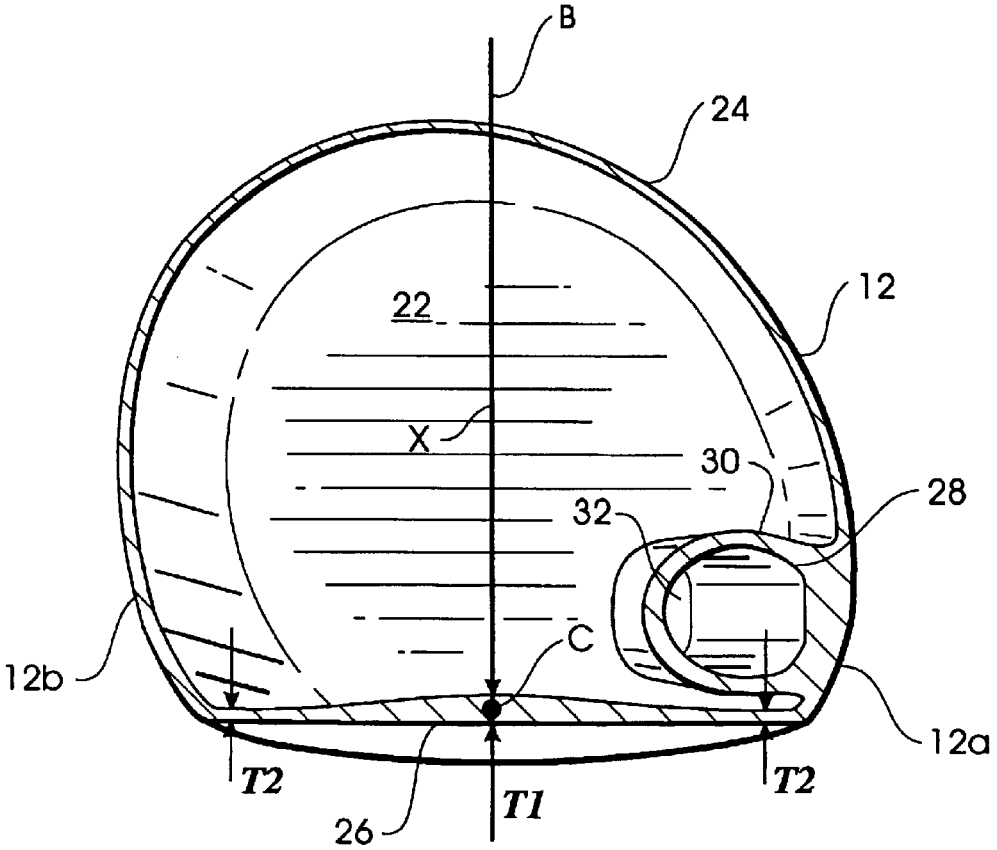
FIG. 10 is a sectional view taken along lines 10—10 in FIG. 1b.

Referring to FIGS. 8–10, it will be understood that the front wall 26 of the body 18 is reinforced by providing it with increased thickness near its geometric center C. The front wall 26 varies in thickness in a first plane A that is disposed substantially horizontally between the top and bottom walls 20, 22 of the body 18. The front wall 26 also varies in thickness in a second plane B that is disposed substantially vertically between the head heel and the toe ends 12a, 12b.

As seen in FIGS. 9 and 10, the front wall 26 has increased thickness along an axis X where the planes A and B intersect. Since this axis X extends through the geometric center C of the front wall 26, the increased thickness of the front wall 26 is greatest at the geometric center C. The front wall increased thickness gradually decreases in a first direction extending from the axis X to the top wall 20, in a second direction extending from the axis X to the bottom wall 22, in a third direction extending from the axis X to the heel end 12a, and in a fourth direction extending from the axis X to the toe end 12b.

The head front wall 26 has a first thickness dimension T1 at its geometric center C, a second thickness dimension T2 adjacent the heel and toe ends 12a, 12b, and a third thickness dimension T3 adjacent the top and bottom walls 20, 22. The thickness dimension T1 is greater than the thickness dimensions T2 and T3; and the thickness dimensions T2 and T3 may be equal. In the preferred embodiment, the thickness dimensions T1 is between 0.130 and 0.180 inch, the thickness dimension T2 is between 0.040 and 0.125 inch, and the thickness dimension T3 is between 0.040 and 0.125 inch.

By reinforcing the front wall 26 with the increased thickness T1 as described above, front wall 276 is strengthened at its geometric center C where loading is the greatest when impacting a golf ball. Also, by providing the front wall 26 with the decreased thickness dimensions T2 and T3, mass is redistributed to other parts of the head 12 to enhance performance of the golf club 10.

Figure 11:
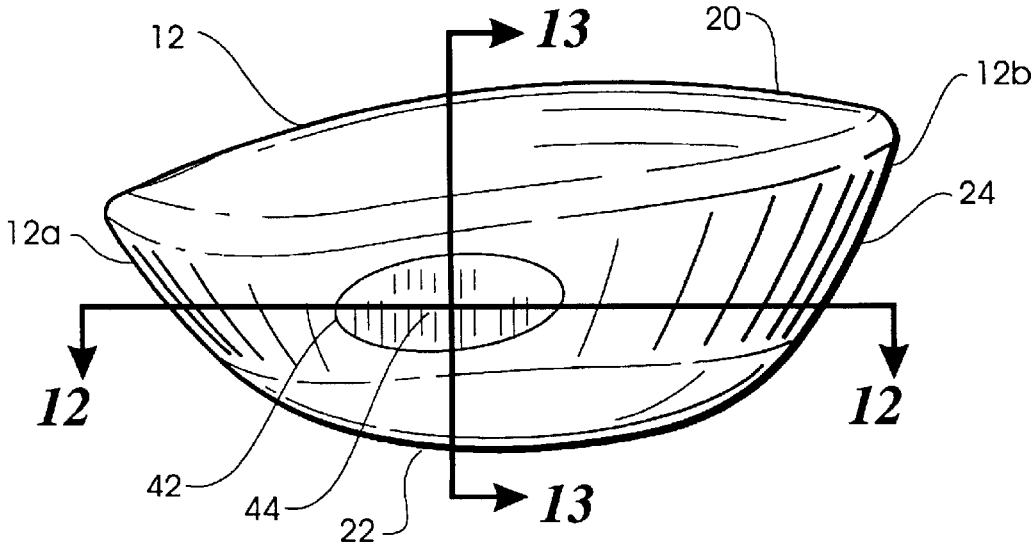
FIG. 11 is a rear elevational view of another embodiment of the hosel shown in FIGS. 1a and 1b.
Figure 2:
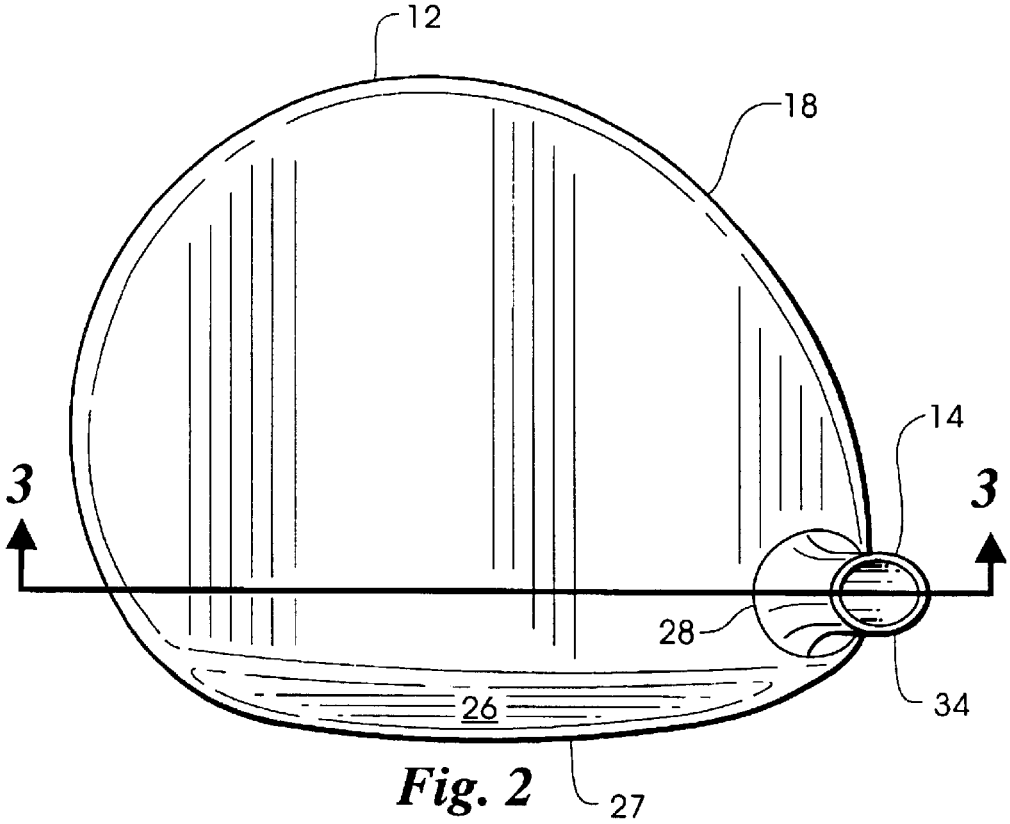
FIG. 2 is a top plan view of the golf club shown in FIG. 1 with the shaft removed.
Figure 12:
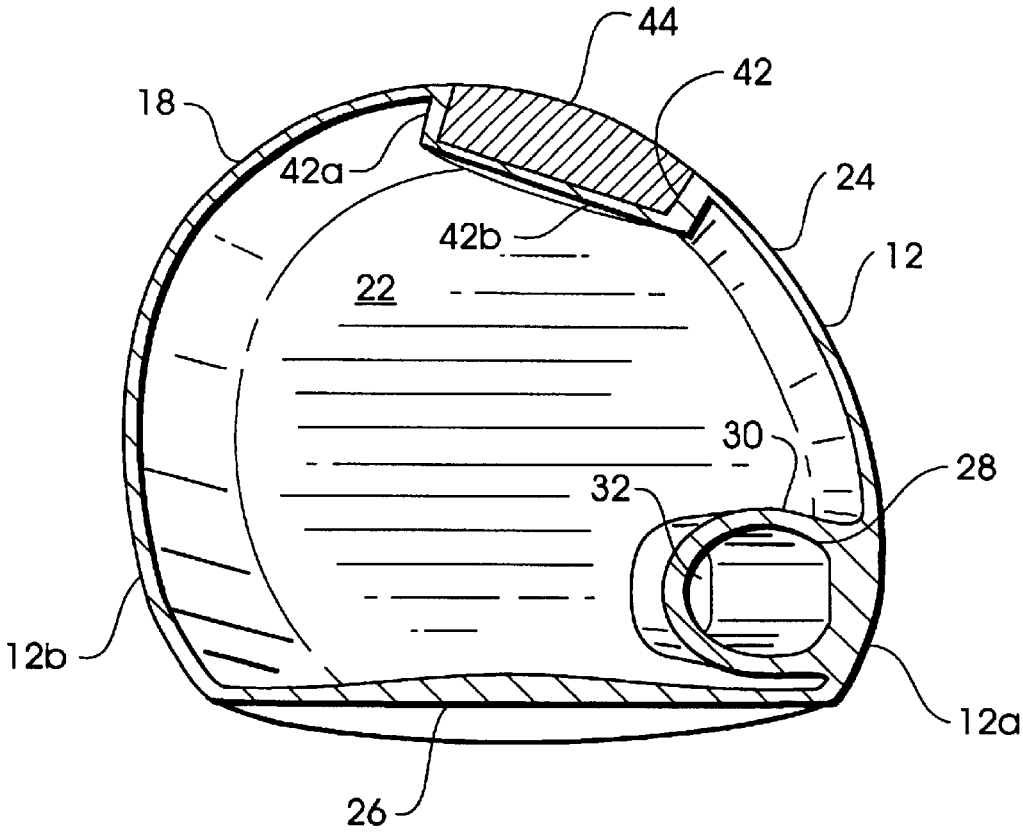
FIG. 12 is a sectional view taken along lines 12—12 in FIG. 11.
Figure 13:
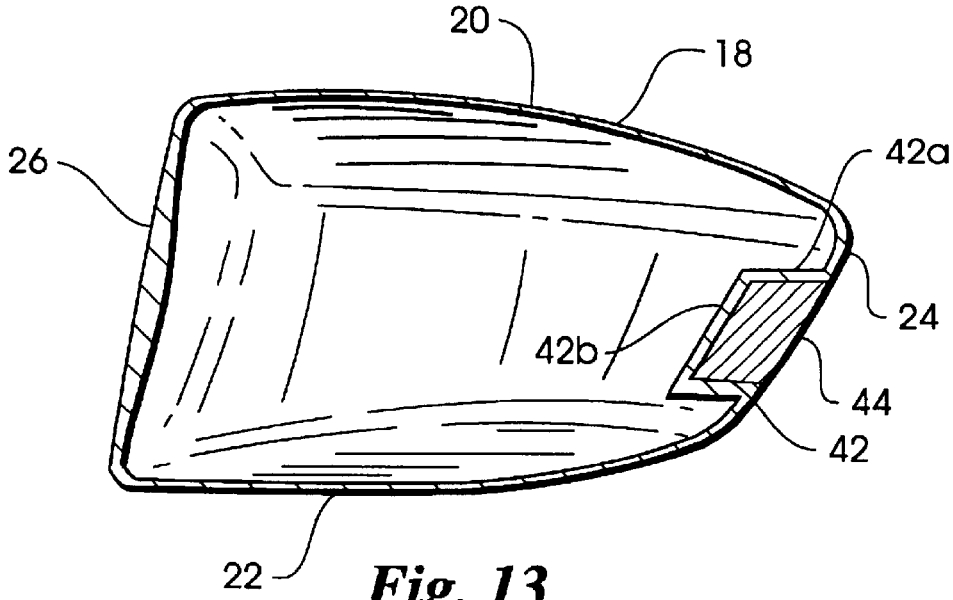
FIG. 13 is a sectional view taken along lines 13—13 in FIG. 11.

Referring to FIGS. 11–13, another embodiment of the head 12 is shown wherein the side wall 24 of the hollow body 18 has a recess 42 formed therein between the heel and toe ends 12a, 12b substantially opposite the front wall 26. The recess 42 has a continuous side wall 42a and an end wall 42b. A back weighting member 44 having a predetermined volume is disposed in the recess 42. The back weighting member 44 is selected from a plurality of back weighting members (not shown) that have the same predetermined volume but have different densities and thus different weights. Therefore, the desired weight of the body 18 may be adjusted without changing the predetermined volume of the back weighting member 44. By selecting a back weighting member 44 of the proper weight, manufacturing tolerances can be overcome and swingweight of the golf club 10 may be adjusted in a simple effective manner. The back weighting member 44 is preferably formed of a suitable plastic with metal fillers.

Figure 14:
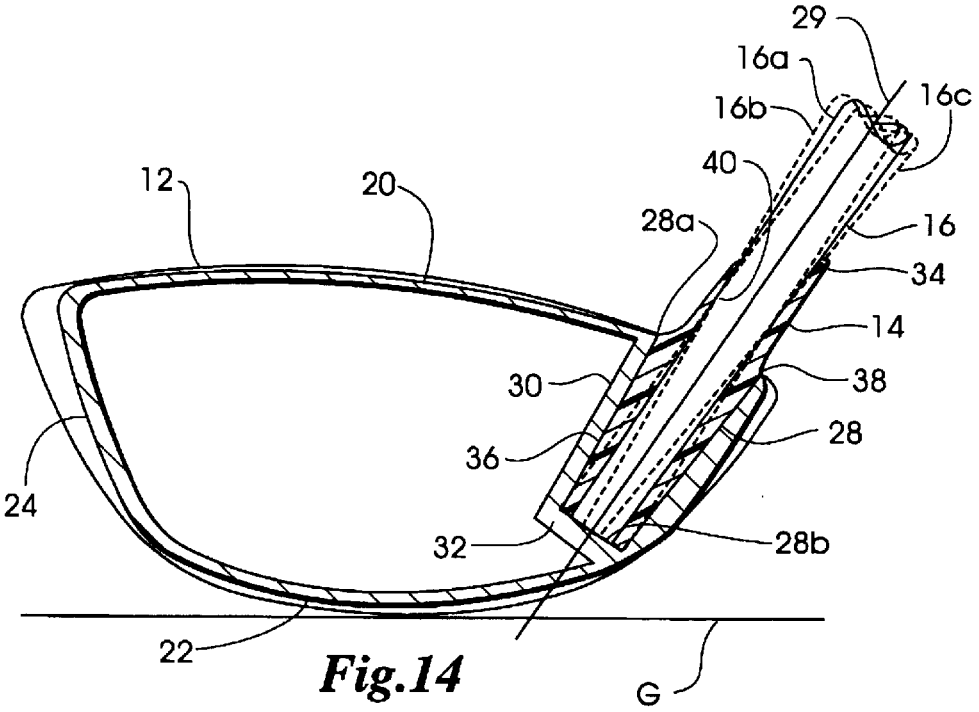
FIG. 14 is a another sectional view similar to FIG. 3 with the shaft oriented in different lie angle positions.
Figure 16:
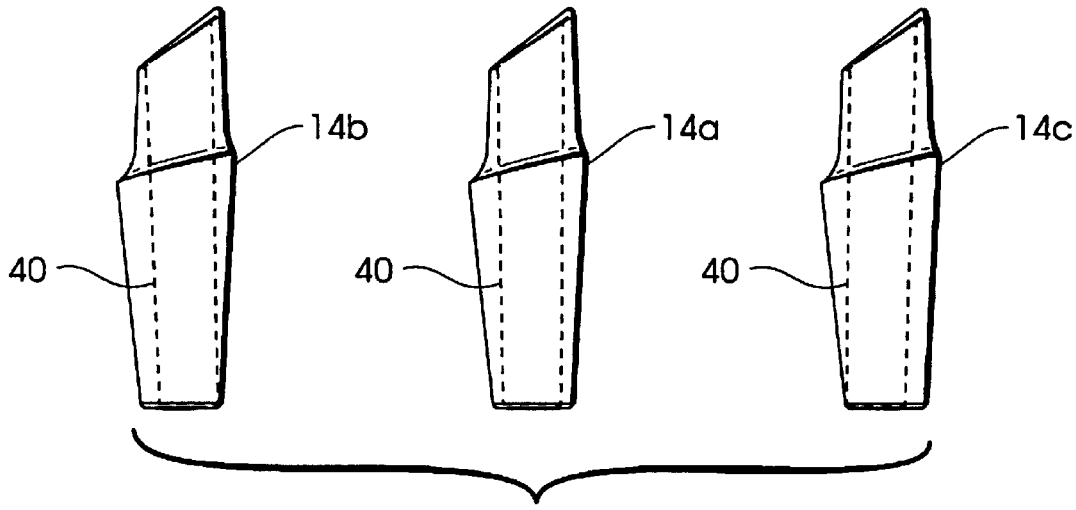
FIGS. 16 and 17 illustrate pluralities of hosels with their passages disposed at different predetermined angles.

As seen in FIG. 14, the golf club 10 may be custom fit to a particular golfer by positioning the shaft 16 in a desired orientation 16a with respect to the head 12 which is commonly known as shaft lie angle. In this shaft orientation 16a, the hosel passage 40 is disposed at a predetermined angle relative to the longitudinal axis 29 of the bore 28 The shaft orientation 16a is provided by using the hosel 14a (FIG. 16) and is considered a standard lie angle position in relation to the ground G. The hosel 14a is selected from a plurality of hosels 14a, 14b, 14c shown in FIG. 16 that will have their passages 40 disposed at different predetermined angles relative to the bore longitudinal axis 29 when inserted into the bore 28. If a golfer desired a shaft orientation that is more upright in relation to the ground G such as shown at 16b in FIG. 14, a different hosel 14b is selected from those seen in FIG. 16 that has its passage 40 disposed at a more upright angle relative to the longitudinal axis 29 of the bore 28. Conversely, if a golfer desires a shaft orientation that is less upright in relation to the ground G such as shown at 16c in FIG. 14, another hosel 14c is selected from those seen in FIG. 16 that has its passage 40 disposed at a less upright angle relative to the bore longitudinal axis 29

Figure 15:
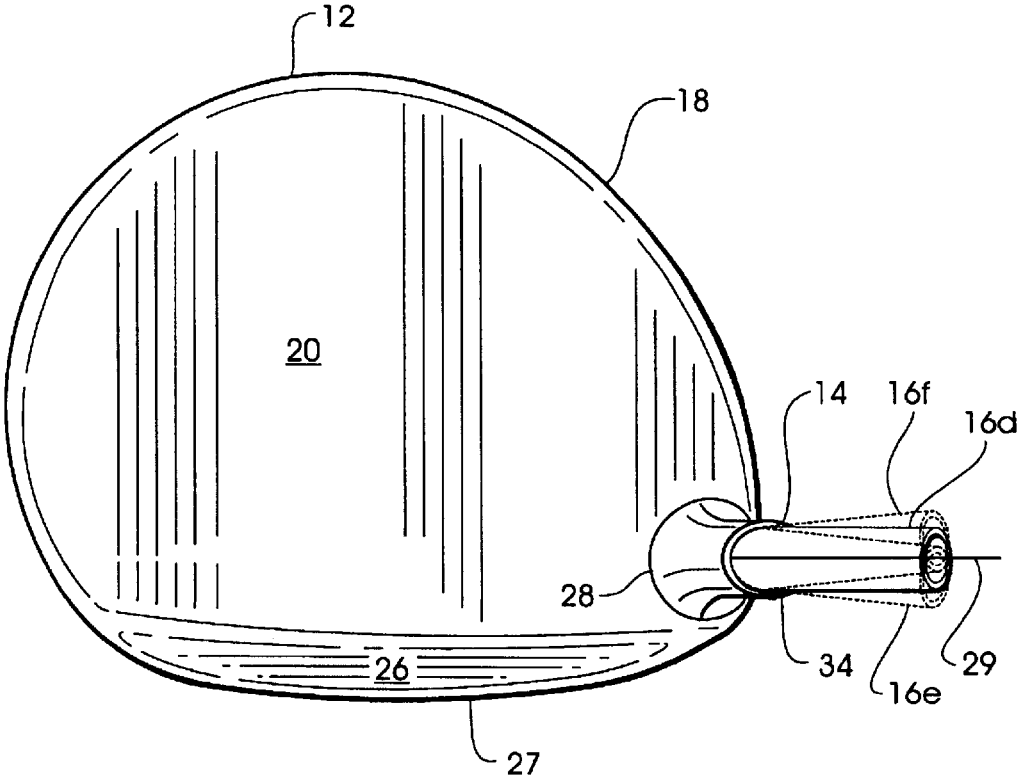
FIG. 15 is another top plan view similar to FIG. 2 of the golf club shown in FIG. 1 with the shaft oriented in different progression angle positions.
Figure 17:
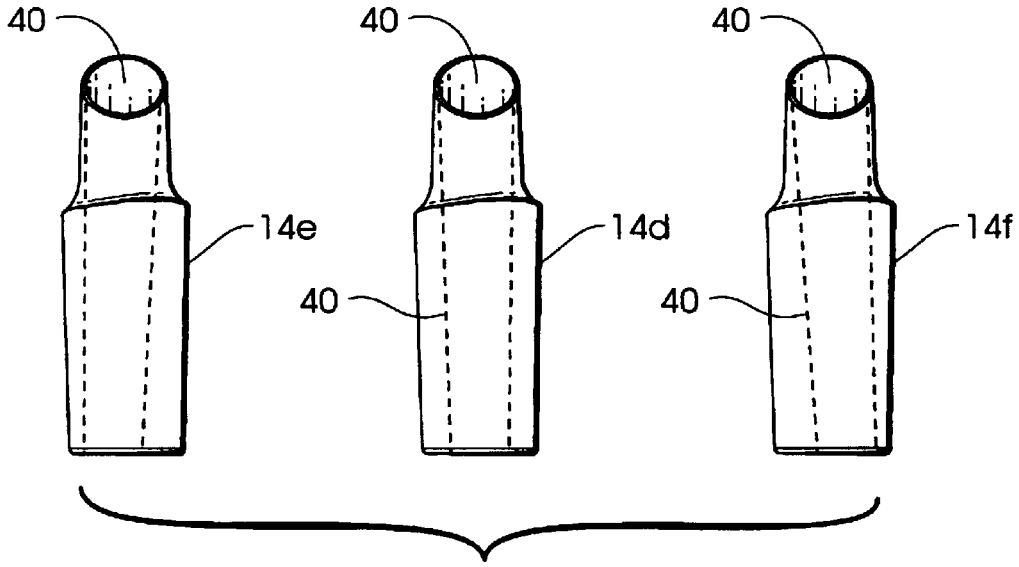

Referring to FIG. 15, it will be understood that the golf club 10 may also be customized by positioning the shaft 16 in a further desired orientation 16d with respect to the head 12 which is known as shaft progression angle. In this shaft orientation 16d, the hosel passage 40 is disposed at another predetermined angle relative to the longitudinal axis 29 of the bore 28. The shaft orientation 16d is provided by using the hosel 14d (FIG. 17) and is considered a neutral progression angle position in relation to the leading edge 27 of the front face 26. If a golfer desired a shaft orientation that is tilted forwardly such as shown at 16e in FIG. 15, a different hosel 14e is selected from those seen in FIG. 17 that has its passage 40 positioned at a forward angle relative to the bore longitudinal axis 29. Conversely, if a golfer desires a shaft orientation that is tilted rearwardly such as shown at 16f in FIG. 15, another hosel 14f is selected from those seen in FIG. 17 that has its passage 40 positioned at a rearward angle relative to the longitudinal axis 29 of the bore 28.

Many different hosels 14 may be utilized in the golf club 10 to orient the shaft 16 in many different lie angle positions and in many different progression angle positions. This is accomplished by providing hosels 14 that have their passages 40 located at different predetermined angles with respect to the bore longitudinal axis 29 when the hosels 14 are inserted into the bore 28. For example, a hosel 14 may be used that positions the shaft 16 in the combined orientations 16a and 16d. Another hosel 14 may be used that positions the shaft 16 in the combined orientations 16a and 16e. A further hosel 14 may be used that positions the shaft 16 in the combined orientations 16a and 16f. Still other hosels 14 may be used that position the shaft 16 in the following combined orientations: 16b and 16d; 16b and 16e; 16b and 16f; 16c and 16d; 16c and 16e; 16c and 16f.

What is claimed is:

1. A golf club in combination with a plurality of hosels wherein each of said hosels has a passage extending generally lengthwise thereof, said passage being disposed at a different predetermined angle for each of said hosels, said golf club comprising:

a head including a hollow body having a top wall, a bottom wall, *and* a front wall arranged for impacting a golf ball, said head further including a heel end and a toe end, said head also having a bore disposed in said heel end behind said front wall extending downwardly from said body top wall toward said body bottom wall, said bore having a longitudinal axis *and a top end flush with said body top wall, said head being made of a first material having an associated shear modulus of elasticity*;

a hosel selected from said plurality of hosels inserted into said bore, said selected hosel *being made of a second material having an associated shear modulus of elasticity lower than that of said first material for causing said selected hosel to absorb shock resulting from said head striking a golf ball on said body front wall and* having *an outer surface which mates with said head so as to position said hosel relative to said bore,* said *hosel* passage *being* oriented at a selected angle relative to said longitudinal axis of said bore;

a shaft having a tip end received in said selected hosel passage *and extending through said hosel passage into said bore below said body top wall,* said shaft being disposed at a desired orientation with respect to said head; and said selected hosel providing the desired orientation of said shaft with respect to said head *and extending unsupported by said head above said body top wall.*

2. The golf club of claim 1 wherein said hollow body further includes a sidewall connecting said top and bottom walls.

3. The golf club of claim 1, wherein said bore has a top end which is open and a bottom end which is closed.

4. The golf club of claim 3, wherein said bore top end is substantially flush with said body top wall and wherein said bore bottom end is spaced from said body bottom wall.

5. The golf club of claim 1, wherein said hosel has a lower portion received in said bore and an upper portion extending upwardly from said body top wall.

6. A method of making a golf club comprising the steps of:

forming a head having a heel end to a toe and wherein said head includes a hollow body having a top wall, a bottom wall, and a front wall arranged for impacting a golf ball, *said head being made of a first material having an associated shear modulus of elasticity*;

forming a bore [having a longitudinal axis] in said heel end of said head being said front face *having a longitudinal axis and a top end flush with said top wall* so that said bore extends downwardly from said top wall toward said bottom wall;

providing a plurality of hosels wherein each of said hosels [has] *is made of a second material having an associated shear modules of elasticity lower than that of said first material for causing said selected hosel to absorb shock resulting from said head striking a golf ball on said front wall and having an outer surface which mates with said head so as to position said hosel relative to said bore, each of said hosels having* a passage extending generally lengthwise thereof and disposed at a predetermined angle, said predetermined angle being different for each of said hosels;

selecting a hosel from said plurality of hosels;

inserting said selected hosel into said bore so that its passage is oriented at a selected angle relative to said longitudinal axis of said bore *and so that it extends unsupported by said head above said top wall of said head*; and inserting a tip end of a shaft into *said bore below said top wall of said head through* said passage of said selected hosel so that said shaft is disposed at a desired orientation with respect to said head.

*7. The golf club of claim 1, wherein said hosel is made of plastic.*

*8. The golf club of claim 7, wherein said head is made of titanium.*

*9. The golf club of claim 1, wherein said head is made of titanium.*

*10. The golf club of claim 1, wherein a front wall of said bore is spaced from said front wall of said body of said head.*

*11. A golf club in combination with a plurality of hosels wherein each of said hosels has a passage extending generally lengthwise thereof, said passage being disposed at a different angle for each of said hosels, said golf club including a shaft, a head and a hosel selected from said plurality of hosels inserted in a bore in said head, with an end of said shaft inserted in said selected hosel, wherein said head comprises a hollow body having a top wall, a bottom wall, and a front wall arranged for impacting a golf ball, said bore having a top end which is substantially flush with said body top wall and a bottom end which is spaced from said body bottom wall, said head further including a heel end and a toe end and a wall structure disposed in said heel end and defining said bore, said wall structure extending downwardly from said body top wall toward said body bottom wall and having a front side which is spaced apart from a rear side of said front wall of said body for disposing said bore in a position with said bottom end above said body bottom wall and rearwardly away from said rear side of said front wall while supporting said shaft above said bottom wall with said selected hosel which extends unsupported by said head above said body top wall.*

*12. A golf club as in claim 11, wherein said bore top end is open and said bore bottom end is closed.*

*13. A golf club as in claim 11, wherein said selected hosel inserted in said bore has said passage oriented at an angle relative to a longitudinal axis of said bore, wherein said bore is shaped so as to establish a fixed angular position of said hosel passage relative to said bore longitudinal axis when said selected hosel is inserted in said bore.*

*14. A golf club as in claim 11, wherein said passage of said selected hosel has a longitudinal axis which is at an angle relative to a longitudinal axis of said bore.*

*15. A golf club as in claim 11, wherein each of said hosels is made of plastic and said head is made of titanium.*

* * * * *